United States Patent
Mitchell et al.

(10) Patent No.: US 8,555,774 B2
(45) Date of Patent: *Oct. 15, 2013

(54) DISPOSABLE FLAVOR INSERT FOR WATER DISPENSER

(75) Inventors: Alan Joseph Mitchell, Evansville, IN (US); Jason Robert Yochum, Evansville, IN (US); Ginger Elayne Patera, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 788 days.

This patent is subject to a terminal disclaimer.

(21) Appl. No.: 12/195,494

(22) Filed: Aug. 21, 2008

(65) Prior Publication Data

US 2008/0302123 A1   Dec. 11, 2008

Related U.S. Application Data (63) Continuation of application No. 11/027,124, filed on Dec. 31, 2004, now Pat. No. 7,472,643.

(51) Int. Cl.
*A47J 31/06* (2006.01)
*A47J 31/00* (2006.01)

(52) U.S. Cl.
USPC ............... 99/279; 99/290; 99/295; 99/306; 99/307; 62/389

(58) Field of Classification Search
USPC ........... 99/290, 295, 275, 279, 304, 306, 307; 62/389, 390, 391, 908; 222/146.6, 222/146.1, 129.1; 426/77, 78, 212
See application file for complete search history.

(56) References Cited

U.S. PATENT DOCUMENTS

| | | | |
|---|---|---|---|
| 2,283,967 A | 5/1942 | Brown |
| 2,551,219 A | 5/1951 | Peters et al. |
| 2,589,783 A | 3/1952 | Peters et al. |
| 2,743,664 A | 5/1956 | Dale |
| 3,260,190 A | 7/1966 | Levinson |
| 3,292,527 A | 12/1966 | Stasse |
| 3,295,998 A | 1/1967 | Goros |
| 3,445,237 A | 5/1969 | Gidge |
| 3,450,024 A | 6/1969 | Martin |
| 4,382,402 A | 5/1983 | Alvarez |
| 4,389,925 A | 6/1983 | Piana |
| 4,584,101 A | 4/1986 | Kataoka |

(Continued)

FOREIGN PATENT DOCUMENTS

| | | |
|---|---|---|
| EP | 0 326 685 A | 8/1989 |
| EP | 1 101 430 A | 5/2001 |

(Continued)

*Primary Examiner* — Reginald L Alexander
(74) *Attorney, Agent, or Firm* — Kirk W. Goodwin; McKee, Voorhees & Sease, P.L.C.

(57) ABSTRACT

A water dispenser is provided which includes a housing for the dispenser, a dispensing area associated with the housing and including a space for receiving a receptacle for receiving a charge of water from the dispenser, a water outlet through which water is dispensed into the dispensing area, and a fixed flange support positioned between the water outlet and the dispensing area arranged to receive a flavor insert device in a substantially horizontally sliding manner. The flavor insert device includes a cup having a flange extending around at least a portion of a periphery of the cup, a porous enclosure located in the cup, and a supply of solid flavor particles contained in the porous enclosure.

14 Claims, 7 Drawing Sheets

(56) References Cited

U.S. PATENT DOCUMENTS

| | | | |
|---|---|---|---|
| 4,708,266 A * | 11/1987 | Rudick | 222/105 |
| 4,808,346 A | 2/1989 | Strenger | |
| 4,867,993 A * | 9/1989 | Nordskog | 426/77 |
| 4,921,712 A | 5/1990 | Malmquist | |
| 4,975,292 A | 12/1990 | Loizzi | |
| 4,996,066 A | 2/1991 | Love et al. | |
| 5,111,740 A | 5/1992 | Klein | |
| 5,243,164 A | 9/1993 | Erickson et al. | |
| 5,498,757 A | 3/1996 | Johnson et al. | |
| 5,567,461 A | 10/1996 | Lehrer | |
| 5,766,453 A | 6/1998 | Morellato et al. | |
| 5,836,169 A * | 11/1998 | Marlette | 62/331 |
| 5,865,094 A | 2/1999 | Kealy | |
| 6,006,655 A | 12/1999 | Bielfeldt et al. | |
| 6,260,476 B1 | 7/2001 | Pope | |
| 6,357,342 B1 * | 3/2002 | Leung | 99/279 |
| 6,672,097 B1 | 1/2004 | Ashley | |
| 6,698,228 B2 | 3/2004 | Kateman et al. | |
| 6,740,345 B2 | 5/2004 | Cai | |
| 7,017,472 B2 * | 3/2006 | Grant et al. | 99/282 |
| 7,444,926 B2 * | 11/2008 | Nottingham et al. | 99/295 |
| 2002/0078831 A1 | 6/2002 | Cai | |
| 2003/0097314 A1 * | 5/2003 | Crisp et al. | 705/28 |
| 2006/0011067 A1 * | 1/2006 | Spencer | 99/307 |
| 2011/0000378 A1 * | 1/2011 | Albrecht | 99/295 |

FOREIGN PATENT DOCUMENTS

| | | |
|---|---|---|
| FR | 2 617 3890 A | 1/1989 |
| GB | 1 427 375 A | 3/1976 |
| NL | 8 701 627 A | 2/1989 |

* cited by examiner

DISPOSABLE FLAVOR INSERT FOR WATER DISPENSER

CROSS REFERENCE TO RELATED APPLICATIONS

This is a Continuation Application of U.S. Ser. No. 11/027,124 filed Dec. 31, 2004 herein incorporated by reference in its entirety.

BACKGROUND OF THE INVENTION

Water dispensers are known, whether as a stand alone appliance, such as disclosed in U.S. Pat. No. 5,766,453 or in combination with another appliance, such as a refrigeration appliance, for example, as disclosed in U.S. Pat. No. 6,672,097. Typically such water dispensers include a dispensing area which has a space to receive a receptacle, such as a cup, which is to be filled with water from the dispenser.

There are also known arrangements for adding flavors to water as it is dispensed into a receptacle. For example, U.S. Pat. No. 4,996,066 discloses a beverage flavoring cassette to be used in conjunction with a cup that the cassette attaches to. The cassette includes a supply of flavoring particles held within a ring between two filters. The cup and cassette are then placed over a receptacle for the flavored liquid, and water is dispensed into the open top of the cup. After use, the cassette is discarded and the cup must be cleaned so it can be reused with a fresh cassette which is packaged separately.

U.S. Pat. No. 3,292,527 discloses an apparatus for preparing and dispensing beverages from prefabricated cartridges in which the cartridge has a conical or frusto-conical shape with a sealed top opening and an openable apex end of the cone. Held within the cartridge is a loose supply of a product which provides the flavoring to the water. A perforated disc is also provided within the cartridge to provide a pressure drop within the cartridge and to act as a filter for the flavoring product. The sealed top of the cartridge is to be pierced by a water supply conduit when water is to introduced into the cartridge. The cartridge is held in place by lifting the body of the cartridge over a ring shaped support and then dropping the cartridge into the ring shaped support where it is held during the dispensing process.

SUMMARY OF THE INVENTION

The present invention provides an improved disposable flavor insert and water dispenser to allow for ease in flavoring water with a variety of different flavors, and ease in cleanup after the flavored water has been dispensed.

In an embodiment, a flavor insert device is provided including a cup which may have a flange extending around at least a portion of a periphery of the cup, a porous enclosure located in the cup, and a supply of solid flavor particles contained in the porous enclosure. In an embodiment, the cup may have a perforated wall through which the water and dissolved flavor particles leave the cup, and in an embodiment, the cup may be formed from a plastic material, such as polyethylene.

In an embodiment, the cup may include a water inlet and a water outlet and further may include a removable seal covering the water inlet and the water outlet. In an embodiment, the water inlet and the water outlet may be coextensive and a single removable seal may be provided to cover the inlet and outlet.

In an embodiment, the porous enclosure may be a porous bag and the cup may include retaining walls arranged to receive and secure the porous bag therein. In an embodiment, a supply container may be provided for receiving a plurality of flavor inserts, the supply container having a moisture impervious body and a removable lid sealable to the body in a moisture impervious manner.

In an embodiment, the invention provides a water dispenser, including a housing for the dispenser, a dispensing area associated with the housing and including a space for receiving a receptacle for receiving a charge of water from the dispenser, a water outlet through which water is dispensed into the dispensing area, and a fixed flange support positioned between the water outlet and the dispensing area arranged to receive a flavor insert device in a substantially horizontally sliding manner. The water dispenser may be a stand alone appliance, or may be incorporated into another appliance, such as a refrigeration appliance.

DETAILED DESCRIPTION OF THE PREFERRED EMBODIMENT

The present invention is directed to a water dispenser for dispensing a flavored water and to a flavor insert device for use with a water dispenser.

Figure 1:
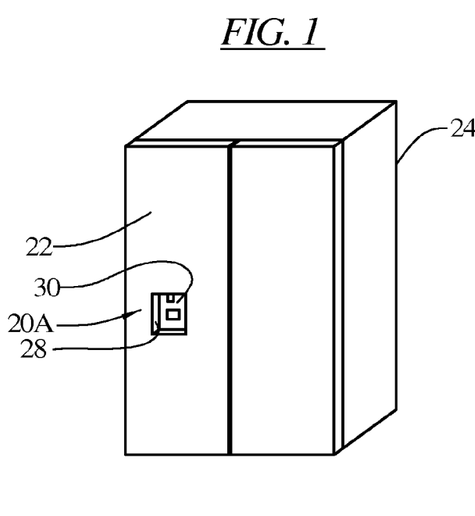
FIG. 1 illustrates a refrigeration appliance incorporating a water dispenser embodying the principles of the present invention.
Figure 2:
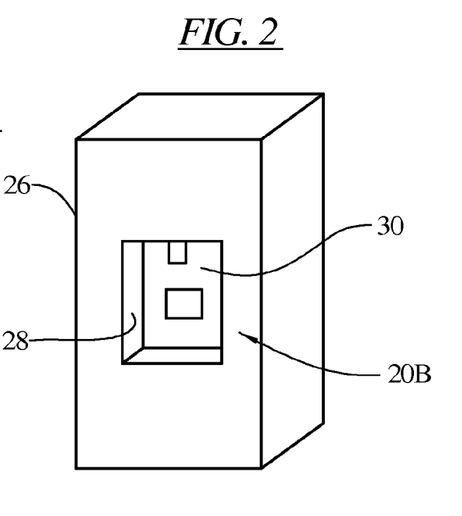
FIG. 2 illustrates a stand alone water dispenser embodying the principles of the present invention.

In FIG. 1, there is illustrated a water dispenser 20A which is located in a door 22 of a refrigeration appliance 24. In FIG. 2, there is illustrated a water dispenser 20B in a stand alone appliance 26. In any environment, whether as a stand alone appliance or as a part of another appliance, the water dispenser 20 (shown isolated in FIG. 3) includes a housing 28 and a dispensing area 30 associated with the housing and including a space (which may be in the form of a recess) for receiving a receptacle 32, such as a drinking glass for receiving a charge of water from the dispenser. A water outlet 34, such as a water dispenser tube is provided, through which water is dispensed into the dispensing area 30. A fixed flange support 36 is positioned between the water outlet 34 and said dispensing area 30 arranged to receive a flavor insert device 40 in a substantially horizontally sliding manner. The fixed flange support 36 may be in the form of a pair of spaced apart generally horizontal flanges spaced slightly below, and laterally to the sides of the water outlet 34. In this manner, the flavor insert device 40 can be positioned close to the water outlet 34 to minimize the space requirements for the flavor insert device, since there is no need to accommodate a full height of the flavor insert device above the fixed flange support 36. The flavor insert device 40 can be installed onto the water dispenser 20 easily from the front of the appliance.

Figure 3:
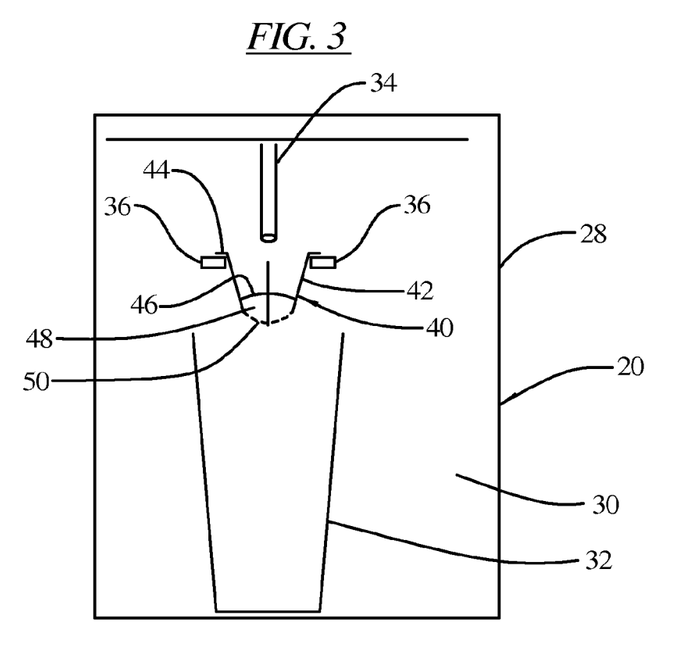
FIG. 3 schematically illustrates a first embodiment of a flavor insert embodying the principles of the present invention.

In FIG. 3 there is schematically illustrated a first embodiment of the flavor insert device 40 which is in the form of a cup 42 having a flange 44 extending around at least a portion of a periphery of the cup. A porous enclosure 46 in the form of a porous bag is located in the cup 42. A supply of solid flavor particles 48 is contained in the porous bag 46. In this embodiment, a wall of the cup 42 is perforated as at 50. The cup 42 may be formed from a variety of materials, and in a preferred embodiment, it is formed of a plastic, such as polyethylene.

The porous bag 46 may be constructed in a variety of manners and from a variety of materials. It may be rigid, semi-rigid, part rigid and part flexible or completely flexible. The bag 46 may be formed of a metal, plastic or fiber perforated material, such as a mesh material including filter paper and tea bag material, or a solid material with a plurality of small openings therein. Preferably the openings are of a size smaller than the individual particles held in the bag 46.

Figure 4:
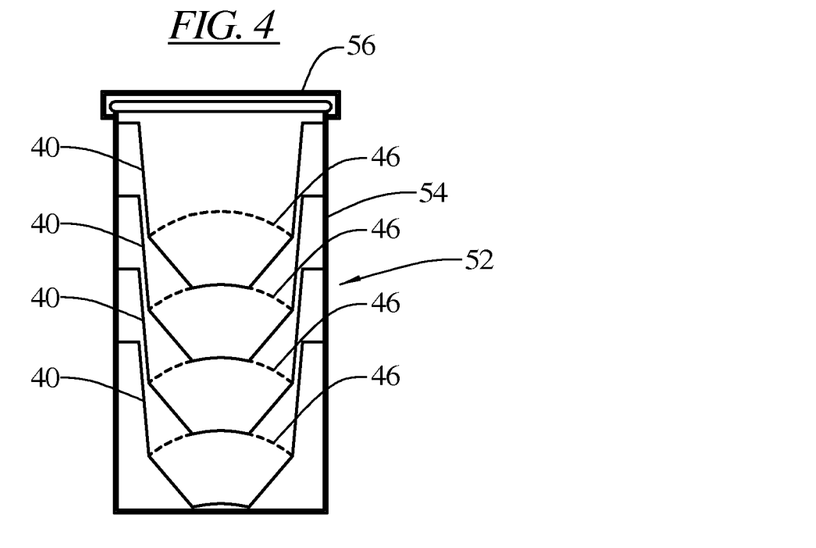
FIG. 4 illustrates a side sectional view of a container for the flavor insert of FIG. 3.
Figure 5:
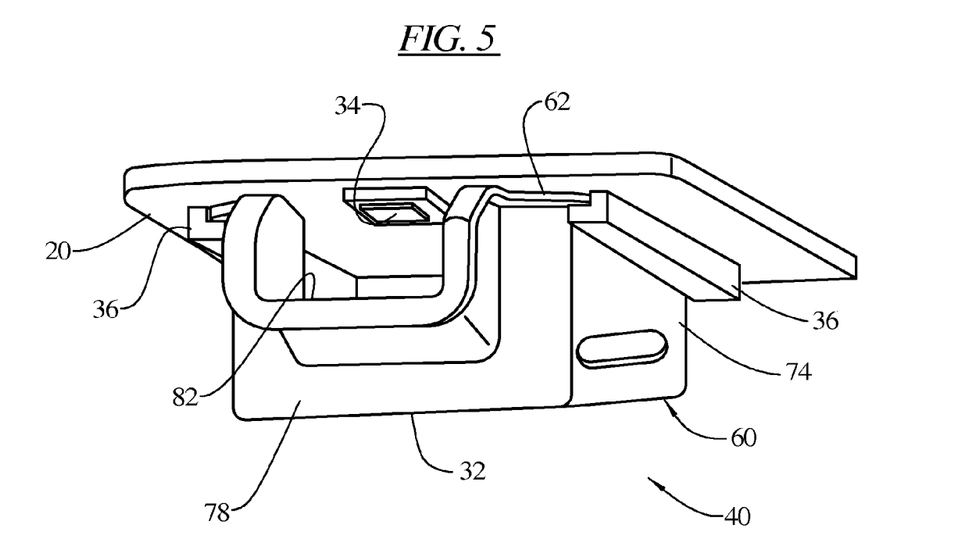
FIG. 5 illustrates a perspective view of a second embodiment of a flavor insert embodying the principles of the present invention as held in a water dispenser.
Figure 6:
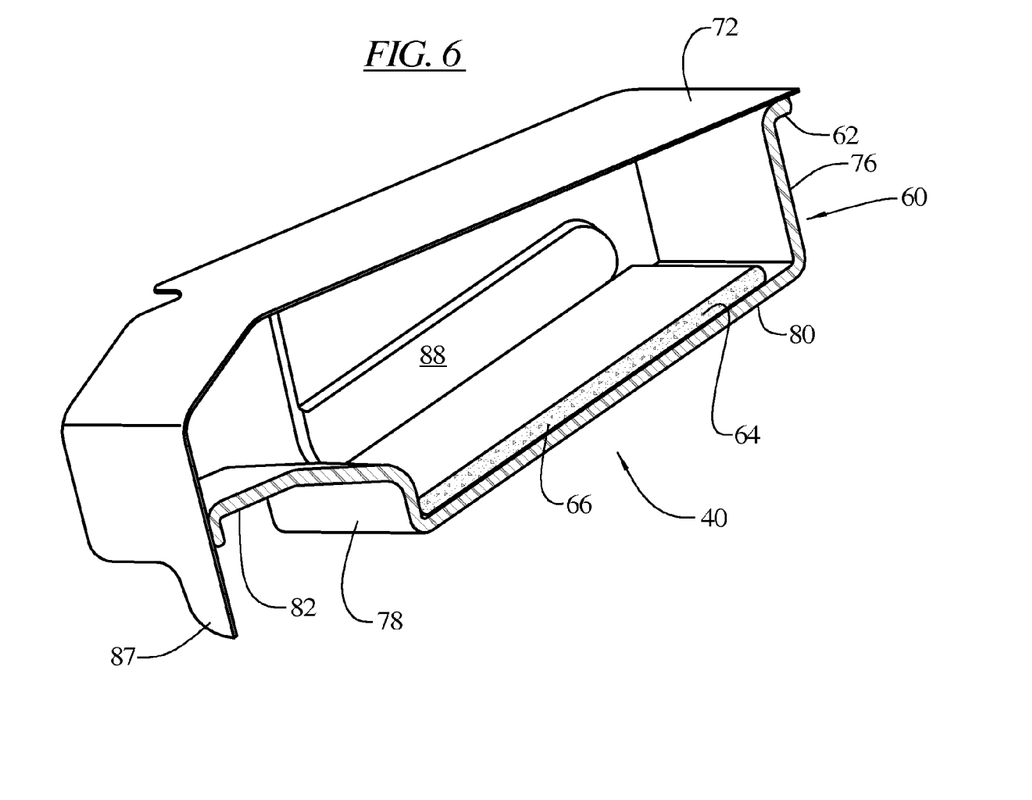
FIG. 6 illustrates a perspective sectional view of the flavor insert shown in FIG. 5.

To use this embodiment, the user selects a flavor insert device 40 of a desired flavor. The flavor insert device 40 may be kept in a supply container 52 (FIG. 4) for receiving a plurality of flavor inserts. Such a supply container 52 may have a moisture impervious body 54 and a removable lid 56 sealable to the body in a moisture impervious manner. Once a flavor insert device 40 is selected, it is inserted into the water dispenser 20 by sliding the flange 44 of the cup 42 onto the flange support 36. If the flavor insert device 40 is formed without a flange, the device may be slid into the flange support 36, with the flange support engaging and supporting the body of the flavor insert device itself. Either way, this will position the flavor insert device 40 directly below the water outlet 34 and above the receptacle 32. When water is dispensed from the water outlet 34, it will enter the open top of the cup 42 and will flow into the porous bag 46 containing the solid flavor particles 48. These solid particles 48, which may be in the form of crystals or powder, will then dissolve into the water and will flow out of the porous bag 46 to flow through the perforated wall 50 of the cup 42 and into the receptacle 32 as flavored water.

After the flavored water is completely dispensed, the receptacle 32 is removed and the flavor insert device 40 is disposed of. There is no mess to clean up since any residual mixture of flavor particles and water is contained within the flavor insert device 40. An endless variety of flavors are available to the user through the selection of an appropriate flavor insert device 40. If no additional flavor is desired, the flavor insert device 40 is not inserted into the dispenser 20, and the water will flow directly from the water outlet 34 and into the receptacle 32 without any hindrance since the flange support 36 is positioned laterally away from the water outlet.

In FIGS. 5-10 a second embodiment of a flavor insert device 40 is illustrated. In this embodiment, the flavor insert device 40 includes a cup 60 comprising a container having a hollow body. The cup 60 has a flange 62 extending around at least a portion of a periphery of the cup. A porous enclosure 64 in the form of a porous bag is located in the cup 60. The bag 64 may be similar in construction to the bag 46 described above. A supply of solid flavor particles 66 is contained in the porous bag 64. In this embodiment, the cup 60 includes a water inlet 68 and a water outlet 70. A removable seal 72 is provided to cover the water inlet 68 and the water outlet 70. The cup 60 may be formed from a variety of materials, and in a preferred embodiment, it is formed of a plastic, such as polyethylene.

In an embodiment as illustrated, the water inlet 68 and the water outlet 70 are coextensive and a single removable seal 72 covers both the inlet and outlet. When the water inlet 68 and the water outlet 70 are separate openings, separate seals 72 will be required.

Figure 7:
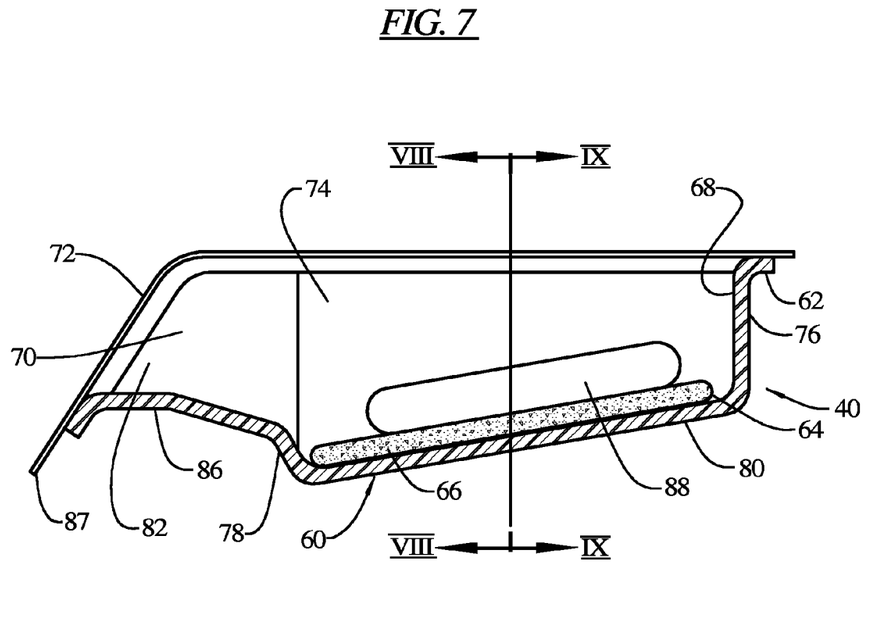
FIG. 7 illustrates a side sectional view of the flavor insert of FIG. 5.
Figure 8:
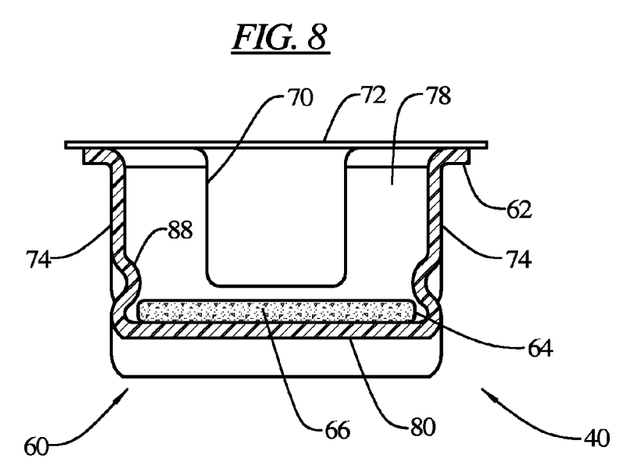
FIG. 8 illustrates a sectional view of the flavor insert of FIG. 5 taken generally along the line VIII-VIII in FIG. 7.
Figure 9:
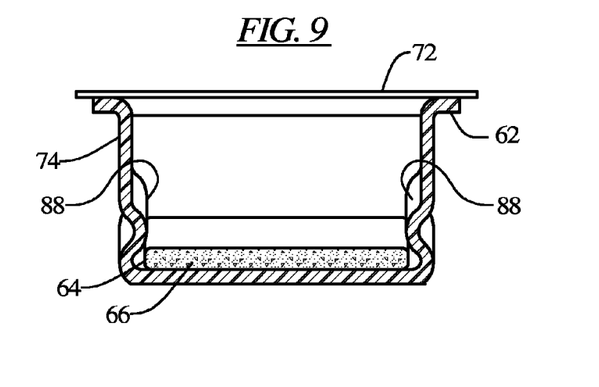
FIG. 9 illustrates a sectional view of the flavor insert of FIG. 5 taken generally along the line IX-IX in FIG. 7.
Figure 10:
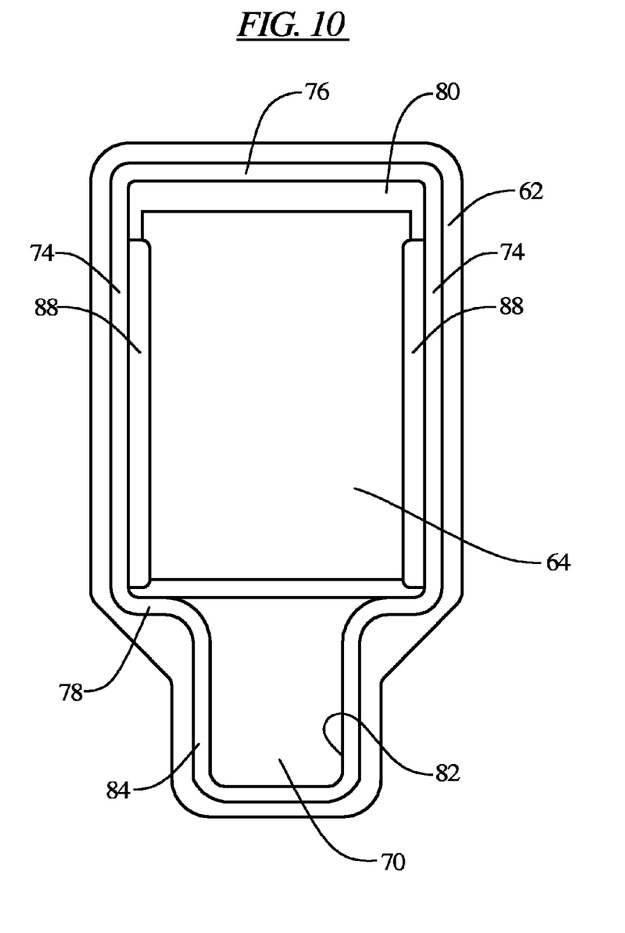
FIG. 10 illustrates a plan view of the flavor insert of FIG. 5 with the foil seal removed.

In the illustrated embodiment, the cup 60 has a generally cubic rectangular shape with upstanding side walls 74, a back wall 76, a front wall 78 and a bottom wall 80. As illustrated in FIG. 7, the bottom wall 80 may slope downwardly from the back wall 76 to the front wall 78. The side walls 74, the back wall 76 and the bottom wall 80 are generally planar and smoothly connect with each other along liquid impervious joints. The front wall 78 is configured to have a spout 82 which defines the water outlet 70. The spout 82 comprises a necked down opening from the hollow interior of the cup 60 in that the spout includes short side walls 84 and a short bottom wall 86 leading to the water outlet 70 at the front side of the cup. The flange 62 extends around the entire periphery of the water outlet 70 and the water inlet 68, which are coextensive.

The seal 72 may be a foil seal, such as a lamination of aluminum foil and polyethylene, which can be applied to the flange 62 of the cup 60 by a well known induction or conduction heating process when the cup is formed of a plastic material. The polyethylene side is placed in contact with the container. When heat is applied, the polyethylene melts and bonds to the polyethylene cup 60. The use of a seal 72 provides that the flavor insert device is a sealed capsule, and no further special handling or use of specially sealed containers is required. The seal 72 can easily be removed from the flange 62 of the cup 60 by a manual grasping of a tab 87 and removal of the seal.

On the interior of the cup 60, retaining walls 88, such as ribs, may be arranged to receive and secure the porous bag 64 within the cup. In the arrangement illustrated, the front wall 78 also provides a short step at the front of the bottom wall 80 to prevent the porous bag 64 from sliding out of the cup 60 towards the spout 82. The porous bag 64 may also be held in the cup 60 simply by a press fit with the sidewalls 74 which then act as retaining walls, or by a heat stake between the porous bag material and one or more of the walls 74, 76, 78, 80 which then act as retaining walls, or other well known retention methods and constructions.

Figure 11:
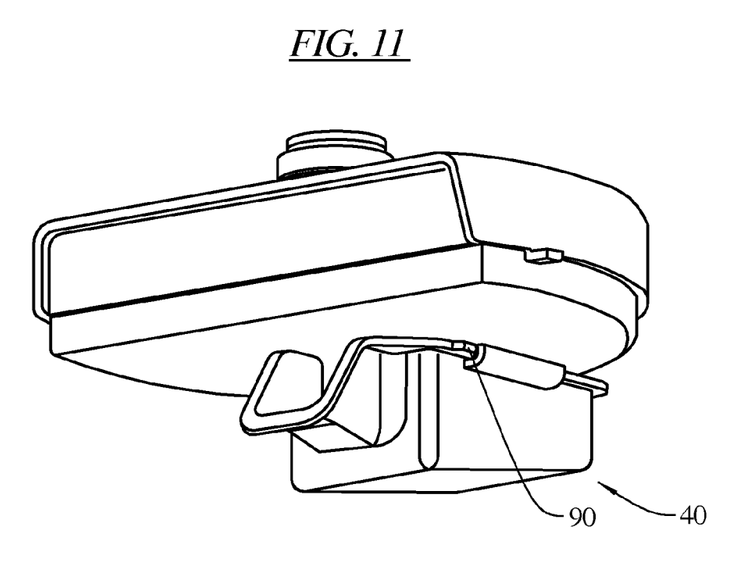
FIG. 11 illustrates a perspective view of a third embodiment of a flavor insert embodying the principles of the present invention as held in a water dispenser.
Figure 12:
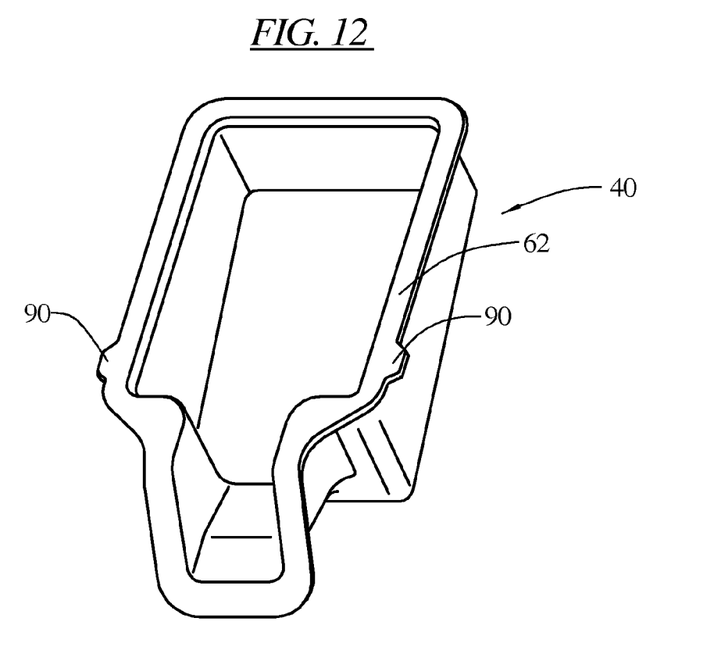
FIG. 12 illustrates a top perspective view of the third embodiment of a flavor insert embodying the principles of the present invention.

To use this embodiment, the user selects a flavor insert device 40 of a desired flavor. Once a flavor insert device 40 is selected, the protective seal 72 is removed. The flavor insert device 40 is then inserted into the water dispenser 20 by sliding the flange 62 of the cup 60 or the cup itself, if not provided with a flange, onto the flange support 36 of the water dispenser 20. This will position the flavor insert device 40 directly below the water outlet 34 and above the receptacle 32. In the embodiment illustrated in FIGS. 5-10, the position of the flavor insert device 40 relative to the water dispenser 20 will be determined by a continuation of the flange support 36 across the back of the flavor insert device receiving area to provide a stop against further movement in the insertion direction. An alternative embodiment is illustrated in FIGS. 11 and 12 in which the flavor insert device 40 is identical in all respects to the embodiment shown in FIGS. 5-10, with the single exception that stop tabs 90 are formed on the flange 62, which stop tabs will engage with the flange support 36 when the flavor insert device 40 is fully inserted into position. This arrangement can be used to avoid the necessity of having the flange support or other stop arrangement extend across the back of the flavor insert device receiving area. In all other respects, the flavor insert devices shown in FIGS. 5-10 and in FIGS. 11-12 are used in an identical manner.

When water is dispensed from the water outlet 34, it will enter the water inlet 68 and will flow into the porous bag 64 containing the solid flavor particles 66. These solid particles 66, which may be in the form of crystals or powder, will then dissolve into the water and will flow out of the porous bag 64 to flow through the spout 82 of the cup 60 and into the receptacle 32 as flavored water.

After the flavored water is completely dispensed, the receptacle 32 is removed and the flavor insert device 40 is disposed of. There is no mess to clean up since any residual mixture of flavor particles and water is contained within the flavor insert device 40. An endless variety of flavors are available to the user through the selection of an appropriate flavor insert device 40. If no additional flavor is desired, the flavor insert device 40 is not inserted into the dispenser 20, and the water will flow directly from the water outlet 34 and into the receptacle 32 without any hindrance since the flange support 36 is positioned laterally away from the water outlet.

Figure 13:
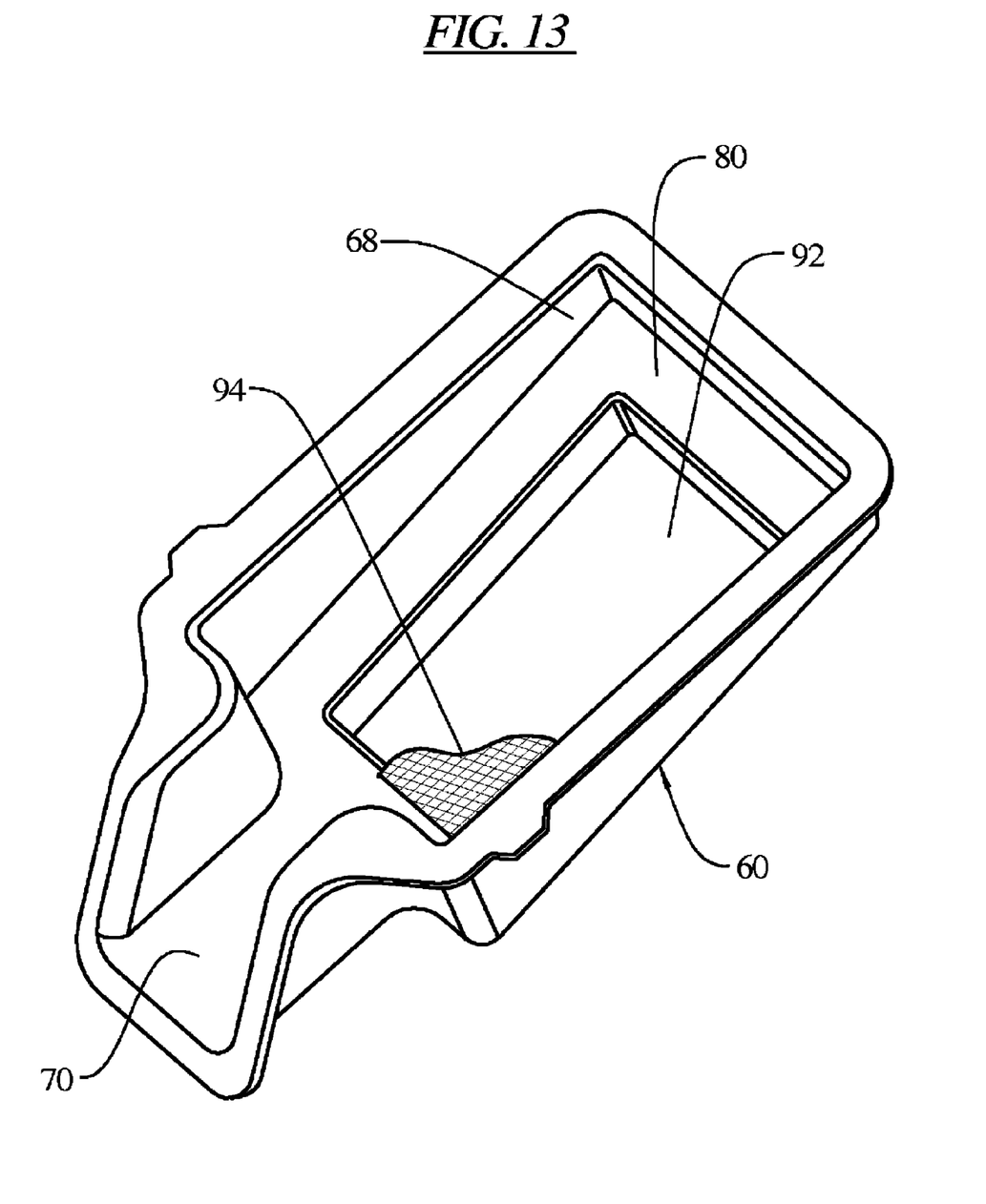
FIG. 13 illustrates a top perspective view of a fourth embodiment of a flavor insert embodying the principles of the present invention.

In FIG. 13 a fourth embodiment of a flavor insert device 40 is illustrated. In this embodiment, the flavor insert device 40 is formed nearly identical to the cup 60 described above, with the exception that a sump or well 92 is formed in the bottom wall 80 of the cup. The supply of solid flavor particles are received in the well 92, and the well is then covered with a porous material 94 to form a porous enclosure within the flavor insert device. The porous material (of any of the types described above) may be heat staked to the bottom wall 80 surrounding the well 92. As described above with respect to FIGS. 6 and 7, a removable seal 72 is provided to cover the water inlet 68 and the water outlet 70. The cup 60 may be formed from a variety of materials, and in a preferred embodiment, it is formed of a plastic, such as polyethylene.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. A refrigerated appliance adapted for use with a flavor insert device, the refrigerated appliance comprising:
   a. a cabinet body having a refrigerated compartment selectably closeable by a door;
   b. a housing with a recess having a water dispensing outlet at the cabinet body for dispensing a stream of water, a dispensing area associated with the housing and including a space with a recess located in the door adapted for receiving a receptacle for receiving the stream of water; and
   c. a flavor insert device having to water inlet, outlet and is flavoring covered by a removable seal, the flavor insert device removably supported at the water dispensing outlet for receiving the stream of water.

2. The refrigerated appliance of claim 1 wherein the flavor insert device is received in a fixed flange at the dispensing outlet in a substantially horizontally sliding manner.

3. A refrigerated appliance comprising:
   a. a cabinet body having a refrigerated compartment with a door;
   b. a dispensing area at the door having a housing with a recess adapted for receiving a receptacle in a space for receiving a stream of water;
   c. a water outlet in the dispensing area through which the stream of water is discharged;
   d. a fixed flange positioned at the dispensing area;
   e. a flavor insert holding device having a cup portion with an inlet in communication with the liquid stream and an outlet in communication with the receptacle, the flavor insert holding device supported by the fixed flange in position to receive the stream of water from the water outlet; and
   f. a flavoring comprising a supply of solid flavor particles contained within a porous enclosure within the cup portion by a removable seal positioned in covering relation over an inlet and outlet of the flavor insert device.

4. The refrigerated appliance of claim 3 wherein the fixed flange comprises a pair of supports rigidly fixed between the water outlet and the dispensing area and spaced apart laterally relative to the stream of water.

5. The refrigerated appliance of claim 3 wherein the cup further comprises a flange extending around at least a portion of an outer periphery of the cup, the flange on the cup received by the fixed flange at the dispensing area in a substantially horizontally sliding manner.

6. The refrigerated appliance of claim 3 wherein the supply of solid flavor particles is positioned within the cup between the inlet and outlet, whereby water moves from the inlet to the outlet by passing through the supply of solid flavor particles.

7. The refrigerated appliance of claim 3 wherein the porous enclosure comprises a porous bag.

8. The refrigerated appliance of claim 3 wherein the porous enclosure comprises a well formed in the cup and covered by a porous material.

9. The refrigerated appliance of claim 3 wherein the water inlet and outlet are coextensive and the single removable seal covers the inlet and outlet.

10. A refrigerated appliance comprising:
    a cabinet body with a door;
    a dispensing area at the door;
    a housing for the dispensing area having it recess providing a space adapted for receiving a receptacle for receiving a stream of water;
    a water outlet in the dispensing area through which the stream of water is discharged;
    a fixed flange positioned at the dispensing area; and
    a flavor insert device supported by the fixed flange in position to receive the stream of water from the water outlet, the flavor insert device further comprises a cup having an inlet in communication with the stream of water and an outlet in communication with the receptacle, wherein the inlet and outlet are coextensive and covered by a single removable seal.

11. The refrigerated appliance of claim 10 further comprising a flavoring enclosed in a porous enclosure within the flavor insert device.

12. The refrigerated appliance of claim 11 wherein the flavor insert device comprises a space in the cup between the inlet and outlet for the porous enclosure.

13. The refrigerated appliance of claim 12 wherein the porous enclosure is removably received within the space.

14. The refrigerated appliance of claim 10 wherein the flavor insert device includes a supply of solid flavor particles.

\* \* \* \* \*